(12) United States Patent
Theodoropulos

(10) Patent No.: US 7,022,858 B2
(45) Date of Patent: Apr. 4, 2006

(54) UNSYMMETRICAL METHINE AND POLYMETHINE DYE-MOLECULES FOR FLUORESCENT INTRACELLULAR APPLICATIONS

(76) Inventor: Spyros Theodoropulos, 2964 Hickory St., Yorktown Heights, NY (US) 10598

( * ) Notice: Subject to any disclaimer, the term of this patent is extended or adjusted under 35 U.S.C. 154(b) by 0 days.

(21) Appl. No.: 10/658,091

(22) Filed: Sep. 9, 2003

(65) Prior Publication Data

US 2004/0047806 A1    Mar. 11, 2004

Related U.S. Application Data

(63) Continuation-in-part of application No. 09/899,888, filed on Jul. 6, 2001, now Pat. No. 6,617,458.

(60) Provisional application No. 60/216,933, filed on Jul. 8, 2000.

(51) Int. Cl.
*C07D 401/02*    (2006.01)
*C09D 11/00*    (2006.01)

(52) U.S. Cl. .................. 546/268.1; 546/255; 546/264; 546/329; 106/31.45; 8/192

(58) Field of Classification Search ................ 546/184, 546/264, 268.1, 329, 255; 8/192; 106/31.45
See application file for complete search history.

(56) References Cited

OTHER PUBLICATIONS

Ca 121:296362, "Factors underlyin the variability of lipid droplet fluroescence in MA-10 Leydig tumor cells", Gocze et al.*
Bradamante et al, Journal of Physical Organic Chemistry, vol. 10, pp. 514-524, 1997.*

* cited by examiner

*Primary Examiner*—Zinna Northington Davis
(74) *Attorney, Agent, or Firm*—William R. Moran

(57) ABSTRACT

A new class of alpha-cyanomethine and alpha-cyanopolymethine dyes is provided having moieties which serve for the covalent attachment to biological substrates and resulting in the fluorescent labeling of the substrates. The labeled substrates are useful in analytical techniques for the detection and measurement of biological and clinical compounds of interest. Of particular interest is a class of methine molecules which are non-fluorescent in buffer solutions but intensely fluoresce when they enter a cell.

5 Claims, No Drawings

UNSYMMETRICAL METHINE AND POLYMETHINE DYE-MOLECULES FOR FLUORESCENT INTRACELLULAR APPLICATIONS

RELATED APPLICATION

This application is a continuation-in-part of Ser. No. 09/899,888, filed on Jul. 6, 2001, which is based on Provisional Application Ser. No. 60/216,933, filed on Jul. 8, 2000, the entire contents of both applications being hereby incorporated by reference. Ser. No. 09/899,888 issued on Sep. 9, 2003 as U.S. Pat. No. 6,617,458.

BACKGROUND OF THE INVENTION

1) Field of the Invention

This invention relates to a new class of methine and polymethine dyes bearing one or two cyano groups on the alpha carbon atom relative to the nucleus of the dye compounds. The cyano group replacing the hydrogen on the alpha carbon atom next to the nucleus, adds to the photochemical stability of the dyes, increases its fluorescence efficiency and renders other physicochemical stability properties which are very important in the labeling of cells and other biological substrates. In one aspect of this invention, certain of the dyes, while forming non-fluorescent solutions in buffer or other solvents, fluoresce intensely when entering a cell.

A methine and polymethine dye consists of two nucleuses, one of which is positively charged, connected by an olefinic or polyolefinic group conjugated with the other nucleus, thau allowing the two nucleuses to share a resonance mesomeric effect. The group that connects the two nucleuses can also be cyclic, unsaturated, polar or non-polar and should satisfy the conjugation requirements of the dye.

The novel dyes of this invention are also equipped with functionalities which serve in the coupling of these dyes to a variety of biological substrates and other organic molecules, forming conjugates resulting in the fluorescent labeling of the substrates. The novel compounds are intended for use in analytical techniques for the detection and measurement of biological and clinical compounds of interest.

Typical examples of such compounds are bacteria, viruses, enzymes, drugs, blood groups, hormones, environmental contaminents, nucleotides, chemically modified oligo- and polynucleotides, toxins, food, genes and cells.

2) Background Art

Methine and polymethine dyes being in the form of cyanine, merocyanine or squaraine dyes have been known for quite some time and a few are commercially available. None of the previously known dyes, however, appears to have cyano groups in the alpha carbon relative to the nucleus of which they are composed and even fewer possess functionality which serves in the attachment of the polymethine dyes to biological substrates of interest.

Accordingly, one or more of the following objects can be achieved by the practice of this invention. It is an object of this invention to provide novel alpha-cyano-methine and polymethine dyes with interesting physicochemical properties which are very important in the labeling of cells and other biological substrates. Another object for this invention is to provide novel cyano-methine and cyano-polymethine dyes which may be readily coupled to compounds of clinical interest. A further object of the present invention is to provide novel cyano-methine and cyano-polymethine dyes which will exhibit distinct fluorescence excitation and emission spectra, corresponding to that of the specific class of chromophors. A still further object of this invention is to provide processes for the use of derivatives of the dyes for the detection and mesurement of biological compounds. These and other objects will readily become apparent to those skilled in the art in the light of the teachings herein set forth.

SUMMARY OF THE INVENTION

In its broad aspect, the present invention is directed to novel alpha-cyano-methine and alpha-cyano-polymethine chromophoric compounds, processes for their preparation and use in the measurement and detection of biological compounds.

DETAILED DESCRIPTION OF THE PREFERRED EMBODIMENTS

The present invention is directed to novel alpha-cyano-methine and alpha-cyano-polymethine dyes which are methine and polymethine dyes bearing one or two cyano groups in the alpha carbon relative to the nucleus of which they are composed.

The cyano group replacing the hydrogen in the alpha carbon next to the nucleus adds to the photochemical stability of the dyes, increases its fluorescence efficiency and renders other physicochemical properties which are very important in the labeling of cells and other biological substrates. A methine and polymethine dye consists of two nucleuses connected by an olefinic or polyolefinic group conjugated to the two nucleuses, thus allowing the two nucleuses to share a resonance mesomeric effect. The novel dyes of this invention are equipped with functionalities which serve in the coupling of these dyes to a variety of biological substrates and other organic molecules. The basic structures of the alpha-cyano-methine and alpha-cyano-polymethine dyes which are prepared by the teachings of this invention are conveniently represented by the structural formulas 1 and 2:

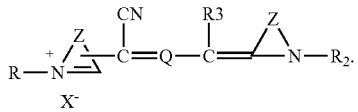

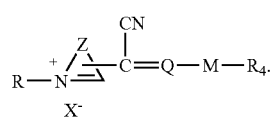

wherein Z represents a group containing non-metallic atoms necessary to complete a heterocyclic or heterobicyclic ring with the atoms to which it is attached. Preferably, Z contains carbon, oxygen, nitrogen or sulfur and up to a total of 25 and more preferably up to 18 carbon atoms. Z can also be substituted with one or more substituents selected from the group consisting of lower alkyl, nitro, halogen, carboxylic, sulfonic and amine groups; Q is an organic radical and is selected from the group consisting of =CH—, =CH—CH=CH—, =CH—CH=CH—CH=CH—

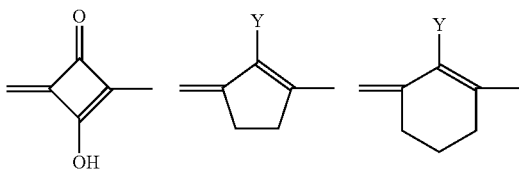

with Y being halogen, OH, SH, amino group, alkoxy which may be substituted, aryloxy group which may be substituted and arylthio group; $R_1$ and $R_2$ are independently selected from the group consisting an alkyl group (1–12 carbon atoms), with the proviso that at least one of the $R_1$ and $R_2$ groups has a substituent selected from the group consisting of —$SO_3H$, $OSO_3H$, $OPO_3H_2$, —COOH, halogen, SH, thioether group, $NHSO_3H$, COOH, N=C=S, —$NHNH_2$, maleimido group, succinate ester, amino group, an aralkyl group which may be substituted and heteroaralkyl group which may be substituted; $R_3$ is hydrogen or cyano group; $R_4$ is —OH, SH, —$OPO_3H_2$, —$NH_2$, primary amino group and secondary amino group; M represents are aromatic or heteroaromatic group containing up to a total of 25 and more preferably up to 1 to 18 carbon atoms. M can also be a heteroaromatic group containing nitrogen, oxygen and sulfur and up to 25 carbon atoms and more preferably up to 18 carbon atoms. M can also be substituted with one or more group substituents selected from the group consisting of lower alkyl, nitro, halogen, carboxyl, sulfonic and phosphoric groups; X— is an anion consisting of an organic or inorganic species such as, for example, Cl—, Br—, I—, $ClO_4$—, $SO_4^{-2}$, $CH_3COO$—, $CH_3CH_2$ COO—.

Typical examples of alpha-cyano-methine and alpha-cyano-polymethine dyes are shown by structural formulas 3–7 below:

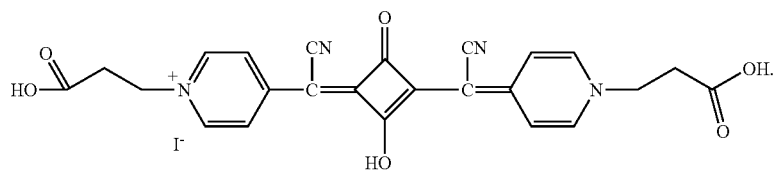

3

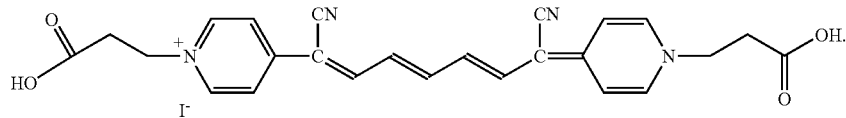

4

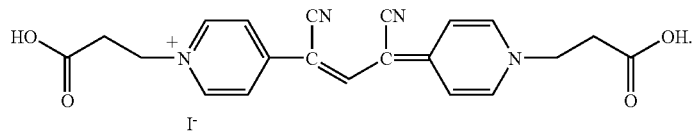

5

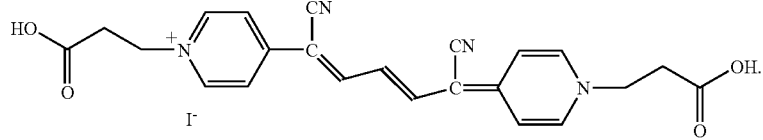

6

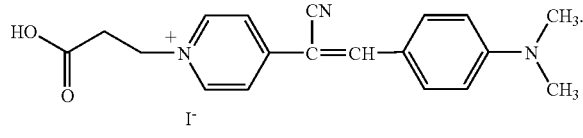

7

The cyano-methine and the dicyanopolymethine dyes of the present invention were synthesized using conventional techniques and empolying either readily available materials or reagents specially designed for this purpose.

The dyes of the invention representing a methine squaraine structure as for example dye 3 above were prepared by allowing a nucleus of the general formula 8:

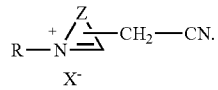

8

(wherein Z, R, and X— are as described previously) to react with squaric acid in a solvent inert to the reactions used in the preparation of this class of dyes. Typical examples representing the nucleus 8 but not limited thereto are as follows:

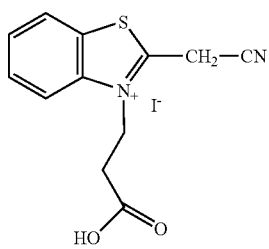

3-carboxyethyl-2-cyanomethyl-benzothiazolium iodide

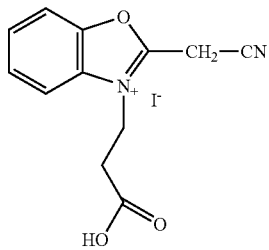

3-carboxyethyl-2-cyanomethyl-benzoxazoliuim iodide

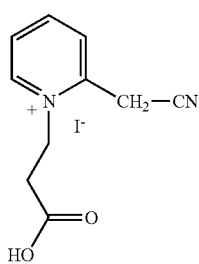

1-carboxyethyl-2-cyanomethyl-pyridilium iodide.

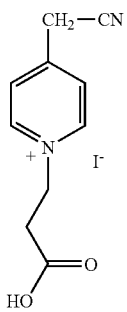

1-carboxyethyl-4-cyanomethyl-pyridinium iodide.

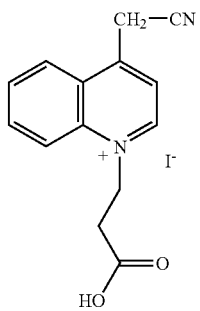

1-carboxyethyl-4-cyanomethyl-quinolinium iodide.

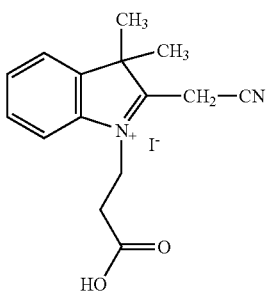

1-carboxyethyl-3-dimethyl-2-cyanomethyl-indolenilium iodide.

An example representing the synthesis of the dicyano-pyridilium-squaraine dye 3 is shown in the following equation:

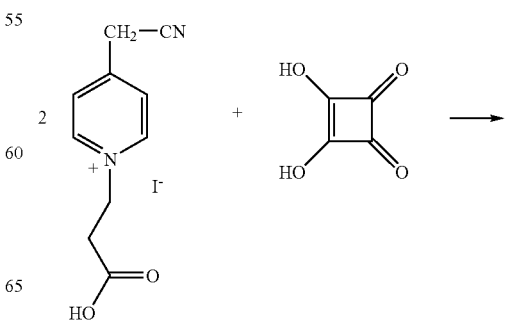

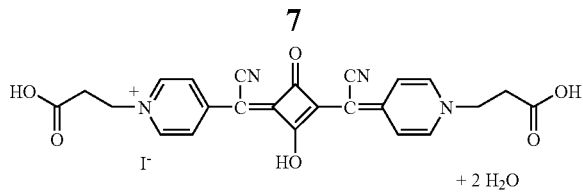

+ 2 H₂O

Synthesis and physical chemical characteristics of squaraine dyes are described by Spenger et al in Ang. Chem. Ind. Arld. 80, 541(1968). Solvents and conditions applied in the synthesis of the cyano-squaraine dyes will become apparent in the experimental section.

Cyanine dyes of the type encompassed by this invention were synthesized utilizing the cyanomethyl nucleus 8 shown above and various reactive intermediates in the area of cyanine and merocyanine dye preparation. For the synthesis of cyanomonomethine dyes of this invention the nucleus 8 was allowed to react with triethylorthoformamide; for the preparation of cyanodimethines, 8 was allowed to react with triethoxypropene; for the preparation of cyanotrimethine dyes, 8 was allowed to react with N-[5-(phenylamino)-2,4-pentadienylilidine] aniline monohydrochloride; and for the synthesis of cyanotrimethine dyes of this invention with a cyclic linking moiety, 8 was allowed to react with N-[(3-anilinomethylene)-2-chloro-1-cyclohexen-1-yl) methylene] aniline monohydrochloride. Synthesis of a variety of cyanine dyes is provided in "Cyanine Dyes and Related Compounds", F. M. Hamer, 1964, Interscience Publishers and by Masuda et al. U.S. Pat. No. 4,404,289 and in U.S. Pat. No. 4,405,711. An example representing the synthesis of a pyridyl-dicyano-trimethine dye of this invention is shown by the following equation:

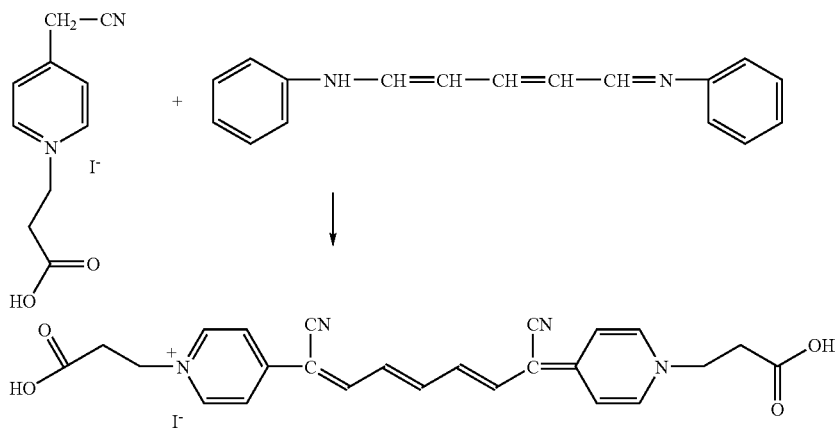

Additional details of the preparation of a variety of cyano-cyanine dyes and cyano-merocyanine dyes will be described in the experimental section.

This invention also relates to a class of cyano-methine and cyano-polymethine dyes represented by the general formula 2, wherein Z, Q, M, R, and $R_4$ are as described above. This class of cyano-methine and cyano-polymethine dyes are derived from the nucleus having the general formula 8 shown above and aromatic aldehydes and reactive ketones. The aldehydes and ketones of the invention utilized in the preparation of this class of dyes are usually substituted with electron rich groups such as primary and secondary amino groups, hydroxyl groups, sulfhydryl, groups, and the like positioned ortho- or para- to the carboxyaldehyde group. An example representing the Synthesis of this class of dyes of this invention is shown in the equation below describing the preparation of the dye No. 7.

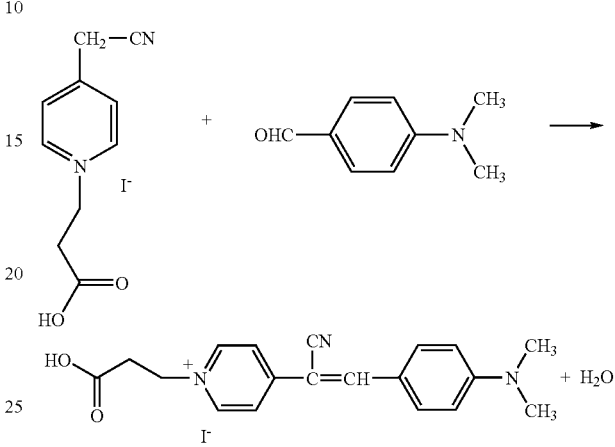

Examples of aldehydes used, butnot limited to, in the preparation of the cyano-methine and cyano-polymethine dyes of the general formula 2, are listed by structural formula below:

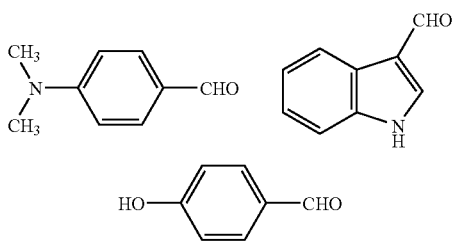

-continued

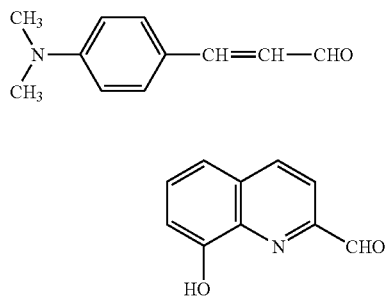
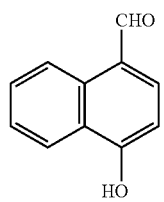

The reaction for the preparation of the cyano-methine and the cyano-polymethine dyes of this invention are carried out in polar solvents such as alcohols, DMF, DMSO and in non-polar solvents such as methylene chloride, toluene, chlorobenzene and the like or in combination of protic and aprotic solvents such as for example n-butanol-toluene mixture. Usually heating is required at temperatures of 30° C. to 200° C. but preferably temperatures ranging between about ambient to 140° C. have been utilized.

The alpha-cyanomethine and the alpha-cyano-polymethine dyes of the invention can be covalently coupled to biological substrates of interest and other organic molecules and macromolecules in order to render the materials to which they are attached detectable by luminescence or light absorption methods. The dyes of this invention can be attached to organic substrates containing a functional group having an active hydrogen through the $R_1$ or $R_2$ groups of the dyes. For example, any compound containing in the classical sense hydroxyl, amino or sulfhydryl groups can be utilized. Accordingly, a wide number of amino acids, antibodies, peptides, proteins, enzymes, enzyme substrates, drugs, antigens, lectins, avidin, strepavidin, pesticides, various natural products, plant and animal hormones, lymphokines, metabolites, receptors, antigen-derivitized nucleic acids, derivatized deoxynucleic acids, DNA fragments, RNA fragments derivitized nucleic acids, virus particles, blood cells, blood cell components, non-cellular blood components, bacteria, polymer particles, glass particles and polymer membranes among others.

As previously set forth, the conjugates of the dyes of this invention with organic substrates of interest are intended for use in many of the several techniques to detect and measure a compound or substrate of interest. The particluar conjugates used will be dependent upon the type of tagging required by the technique of choice and the techniques selected will be determined by the results required.

In another preferred embodiment of this invention, certain of the compounds similar to those of formula 2 comprise a novel class of unsymmetrical methine and polymethine molecules and their use as fluorescent labels for intracellular applications. The molecules of this aspect of the invention constitute a class of cell incorporative agents which while forming non-fluorescent solutions in buffer or other solvents they fluoresce intensely when entering the cell itself These molecules have been found to also fluoresce when incorporated into polymer matrices or when applied on the surface of plastic, gells and paper. Furthermore, the molecules of the present invention do bear reactive groups which serve for the attachment of the molecule to biological substrates and can therefore be used either directly in the labeling of cells or as conjugates to biological substrates. Typical examples of biological substrates used for conjugation include proteins, peptides, enzymes, hormones, antigens, drugs and the like. The molecules of this invention are used for imaging techniques utilizing fluorescent microscopy, in high-through-put drug screening based on intracellular interactions of the drug, in basic biomedical research and in a variety of intracellular determinations using fluorescent detection techniques.

Exemplary of such molecules in this embodiment and by way of illustration are those represented by formula 9 below:

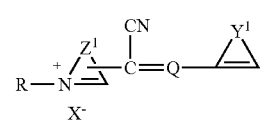

9

Wherein R represents a group of from 1 to 25 carbon atoms and is selected from the group consisting of alkyl, alkenyl, aralkyl hydroxyalkyl, alkoxyalkyl, aryloxyalkyl, aminoalkyl, carboxyalkyl, and arylthioalkyl, $Z^1$ represents a group containing non-metallic atoms necessary to complete a heterocyclic or heteropolycyclic ring with the atoms to which it is attached and may contain at least one member selected from the group consisting of oxygen, nitrogen, selenium, and sulfur and up to 25 carbon atoms, and can be substituted with one or more substituents selected from the group of lower alkyl, nitro, halogen, carboxyl, sulfonic acid, amino and phosphoric groups, $Y^1$ represents a group containing non-metallic atoms necessary to complete a cyclic or polycyclic ring with the atoms to which it is attached and may contain one or more members from the group consisting of nitrogen, oxygen, selenium, or sulfur and up to 25 carbon atoms and can be substituted with one or more substituents selected from the group consisting of lower alkyl, nitro, halogen, carboxylic, sulfonic, hydroxyl, primary amino, secondary amino groups, and whereing Q represents =CH—, =CH—CH=CH—, or =CH—CH=CH—CH=CH— groups.

The methane and polymethine molecules of this aspect of the invention were synthesized from aromatic aldehydes and cyanomethyl nucleus of the formula

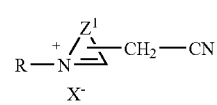

10

Wherein R, $Z^1$ and Q are as defined above for formula 9, and X represents an anion selected from halogen, sulfonic, boron-tetrafluoride, acetic, propionic and the like.

Typical examples of aromatic aldehydes, but not limited to those, used in the synthesis of the methane and ploymethine molecules of this aspect of the invention include 4-dimethylaminobenzaldehyde, indole-3-carboxaldehyde, pyrrole-2-carboxaldehyde, 4-dimethylamino-cynamaldehyle, imidozole-2-carboxaldehyde, p-hydroxybenzyaldehyde, and the like.

The following examples are illustrative of the several aspects of the present invention;

The following examples are illustrative:

EXAMPLE 1

1-(2-carboxyethyl)-4-cyanomethyl-pyridinium Iodide 4-cyanomethyl-pyridine 475 milligrams (0.004) mole were mixed with 1.0 gram of 3-iodopropionic acid (excess) in 100 ml round bottom flask. The flask was closed using a rubber septem and heated at 130 degrees Celsius using an oil bath for six hours. The flask was allowed to cool to ambient temperature and the reaction product was washed by triturating with ether. Acetone 30 ml was added and kept at room temperatures for 12 hours. The precipitated product was filtered and washed with acetone, 755 mg (79%) of product was obtained.

EXAMPLE 2

Squaraine Dye (Formula No. 3)

Squaric acid 25 mg (0.00021 mol) and 180 mg (0.00057 mol) of 1-carboxyethyl-4-cyanomethyl pyridinium iodide were mixed in 20 ml of methanol and the mixture was heated to reflux for 48 hours. The reaction was allowed to reach room temperature then evaporated to dryness using reduced pressure. The product washed with acetone afforded 80 mg of the squarane dye the product characterized by ultra violet absorption showed maximum peak at 643 nm using methanol as the solvent. The product characterized by fluorescence spectrosopy showed an excitation maximum at 627 nm and an emmision maxima at 664 nm using PBS bufffer pH 7.8 as the solvent.

EXAMPLE 3

4-[1-cyano-2-(4-dimethylamino)phenyl]ethenyl-1-(2-carboxyethyl)pyridinium Iodide Dye (formula NO. 7)

A mixture of 4-cyanomethyl-1-(2-carboxyethyl) pyridinium iodide 318 mg ((0.001 mol) and 300 mg (excess) of 4-(dimethylamino)benzaldehyde in 10 ml of methanol was allowed to stir at ambient temperature for 1 hour the solvent was removed under reduced pressure and the product was washed with ether. 400 mg of the product was obtained. Ultra violet absorption in methanol showd a maximum peak at 512 nm.

EXAMPLE 4

1-(2-carboxyethyl)-4-[1,7-dicyano-7-(1-carboxyethyl)-4-pyridinylidene]heptatrienylidine-pyridinium Iodide. (Dye Formula No. 4)

A mixture of 80 mg of 4-cyanomethyl-1-(2-carboxymethyl)pyridinium iodide, 28 mg of N-[5-(phenylamino)-2,4-pentadienylidene]aniline hydrochloride and 100 mg of sodium acetate in 10 ml of methanol was heated to gently relux for 18 hours. The reaction was allowed to cool to room temperature. the precipitated product was flitered and wshed with methanol. Ultr violet absorption in methanol showed maximum paek at 726 nm.

EXAMPLE 5

Coupling of Squaraine Dye No. 3 to Protein 30 mg of the dye No. 3 made according to example 2 was dissolved in 200 microliters of DMF. To this was added 2.0 mg of dicyclohexylcarbodiimide (DCC) followed by 3.0 mg of N-hydroxysuccinimide (NHS) and the reaction stirredd at ambient temperature for 48 hours. The DMS solution contgaining the succinate ester of the dye was added without purification into 1.0 mg of Human-IGg dissolved in 0.5 ml of sodium carbonate buffer pH-8 and stirred gently for 5 hours. The conjugate was purified by gel permeation chromatography on G-50 Sephadex column eleuted with the same buffer. The labeled protein showed and exitation at 627 nm and an emission at 664 nm.

What is claimed is:

1. An unsymmetrical dye having the formula:

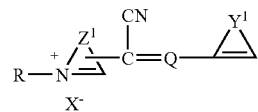

wherein R represents a group of from 1 to 25 carbon atoms and is selected from the group consisting of alkyl, alkenyl, aralkyl, hydroxyalkyl, alkoxyalkyl, aryloxyalkyl, aminoalkyl, carboxyalkyl, and arylthioalkyl, the ring containing $Z^1$ is monocyclic pyridinium and wherein $Z^1$ can be substituted with one or more substituents selected from the group of lower alkyl, nitro, halogen, carboxyl, sulfonic acid, amino and phosphoric groups, $Y^1$ represents a group containing non-metallic atoms necessary to complete a cyclic or polycyclic ring with the atoms to which it is attached and may contain one or more members from the group consisting of nitrogen, oxygen, selenium, or sulfur and up to 25 carbon atoms and can be substituted with one or more substituents selected from the group consisting of lower alkyl, nitro, halogen, carboxylic, sulfonic, hydroxyl, primary amino, secondary amino groups, and wherein Q represents =CH—, =CH—CH=CH—, or =CH—CH=CH—CH=CH— groups $X^-$ is an anion selected from the group consisting of $Cl^-$, $Br^-$, $I^-$, $ClO_4^-$, $SO_4^{-2}$, $CH_3COO$—, and $CH_3CH_2COO$—, with the proviso that when $Y^1$ is nitrogen Q is not =CH—.

2. The unsymmetrical dye of claim 1 wherein Q is =CH—.

3. The unsymmetrical dye of claim 1 wherein Q is =CH—CH=CH—.

4. The unsymmetrical dye of claim 1 wherein Q is =CH—CH=CH—CH=CH—.

5. The unsymmetrical dye of claim 1 which is 4-[1-cyano-2-(4-dimethylamino) phenyl]ethenyl-1-(2-carboxyethyl)pyridinium iodide.

* * * * *